Feb. 4, 1936.  L. BERTELE  2,029,806

OBJECTIVE

Filed May 29, 1935

Inventor:
Ludwig Bertele.

Patented Feb. 4, 1936

2,029,806

UNITED STATES PATENT OFFICE 2,029,806

OBJECTIVE

Ludwig Bertele, Dresden, Germany, assignor to the firm Carl Zeiss, Jena, Germany Application May 29, 1935, Serial No. 24,038
In Germany July 8, 1932

3 Claims. (Cl. 88—57)

The specification 1,975,678 concerns an objective having a high aperture and a large angular field and correcting the spherical aberrations especially well. This objective, which comprises seven lenses, is composed of a front lens of highly refractive glass, a meniscal middle member whose negative bounding surface faces the image and which consists of three lenses cemented together, and a collective rear member consisting of three lenses cemented together, the said three groups of lenses being separated from each other by spaces of air. Experiments have proved that an objective of this kind whose rear member consists of two lenses and which, accordingly, comprises six lenses only, produces exactly the same effect as an objective comprising seven lenses when the meniscal middle member is especially thick, that is to say when this member has an axial thickness greater than one quarter of the focal length of the objective. It has proved to be especially suitable to make this thickness even greater than one third of the focal length of the objective. The radius of curvature of the cemented surfaces of the rear member is to be smaller than half, and preferably even smaller than one quarter of, the focal length of the objective.

Figure 1:
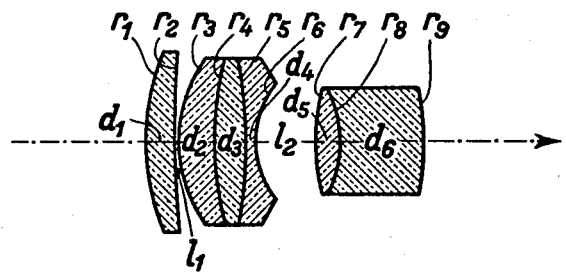
Figure 2:
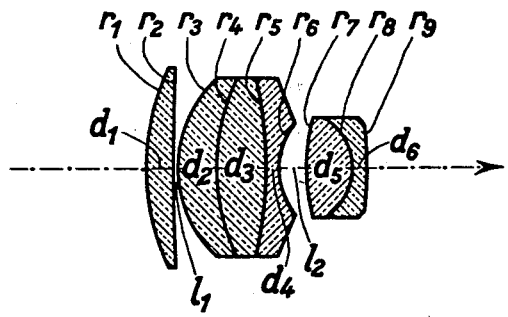

Each of the Figures 1 and 2 of the accompanying drawing represents diagrammatically an example of the invention.

The data of the following table have reference to a focal length of the objective of 100 units.

Example 1 (Fig. 1)

| Aperture: 1:1.5; Picture angle about 14° | | | |
|---|---|---|---|
| | | $n_D$ | $\nu$ |
| $r_1 = +\ 90.64$ | $d_1 = 11.7$ | 1.6202 | 60.2 |
| $r_2 = +493.61$ | $l_1 = 1.1$ | | |
| $r_3 = +\ 54.11$ | $d_2 = 13.8$ | 1.6702 | 47.3 |
| $r_4 = +127.66$ | $d_3 = 11.7$ | 1.5028 | 60.6 |
| $r_5 = -176.60$ | $d_4 = 4.2$ | 1.7200 | 29.5 |
| $r_6 = +\ 35.74$ | $l_2 = 22.7$ | | |
| $r_7 = +\ 84.19$ | $d_5 = 9.4$ | 1.6396 | 48.3 |
| $r_8 = -\ 46.15$ | $d_6 = 31.9$ | 1.5400 | 59.6 |
| $r_9 = -108.81$ | | | |

Example 2 (Fig. 2)

| Aperture: 1:1.4; Picture angle about 16° | | | |
|---|---|---|---|
| | | $n_D$ | $\nu$ |
| $r_1 = +\ 95.62$ | $d_1 = 10.5$ | 1.6202 | 60.4 |
| $r_2 = +789.70$ | $l_1 = 1.1$ | | |
| $r_3 = +\ 43.74$ | $d_2 = 14.3$ | 1.6202 | 60.4 |
| $r_4 = +\ 74.22$ | $d_3 = 18.0$ | 1.4655 | 65.7 |
| $r_5 = -142.70$ | $d_4 = 4.8$ | 1.7400 | 28.2 |
| $r_6 = +\ 26.64$ | $l_2 = 9.9$ | | |
| $r_7 = +\ 69.26$ | $d_5 = 16.5$ | 1.6429 | 47.6 |
| $r_8 = -\ 21.18$ | $d_6 = 4.8$ | 1.6028 | 60.6 |
| $r_9 = -141.74$ | | | |

I claim:

1. A rapid objective comprising six lenses arranged in axial alignment in three groups separated from one another by two air spaces, the first group consisting of a single collective front member of a high refractive index glass, the second group forming a meniscal middle member consisting of three lenses cemented together with the negative bounding surface facing the image and having an axial thickness greater than one quarter and less than one half of the focal length of the objective, and the third group forming a collective rear member consisting of two lenses cemented together with the lens facing the image being dispersive and the other lens being collective, and the radius of curvature of the cemented surfaces of said rear member being smaller than half the focal length of the objective, and said cemented surface being concave toward the object.

2. In a rapid objective according to claim 1, the middle member having a medial thickness greater than one-third of the focal length of the objective.

3. In a rapid objective according to claim 1, the radius of curvature of the cemented surfaces of the rear member being smaller than one-quarter of the focal length of the objective.

LUDWIG BERTELE.